United States Patent
Chawla et al.

(10) Patent No.: US 11,886,480 B2
(45) Date of Patent: Jan. 30, 2024

(54) DETECTING AFFECTIVE CHARACTERISTICS OF TEXT WITH GATED CONVOLUTIONAL ENCODER-DECODER FRAMEWORK

(71) Applicant: Adobe Inc., San Jose, CA (US)

(72) Inventors: Kushal Chawla, Kadubeesanahalli (IN); Niyati Himanshu Chhaya, Hyderabad (IN); Sopan Khosla, Kadubeesanahalli (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/822,837

(22) Filed: Aug. 29, 2022

(65) Prior Publication Data

US 2022/0414135 A1 Dec. 29, 2022

Related U.S. Application Data

(63) Continuation of application No. 16/224,501, filed on Dec. 18, 2018, now Pat. No. 11,449,537.

(51) Int. Cl.
*G06F 16/35* (2019.01)
*G06N 3/08* (2023.01)
(Continued)

(52) U.S. Cl.
CPC .............. *G06F 16/35* (2019.01); *G06F 40/10* (2020.01); *G06F 40/279* (2020.01); *G06N 3/04* (2013.01); *G06N 3/08* (2013.01); *G06N 20/00* (2019.01)

(58) Field of Classification Search
CPC ........ G06F 16/35; G06F 40/10; G06F 40/279; G06F 16/313; G06F 40/284;
(Continued)

(56) References Cited

U.S. PATENT DOCUMENTS 10,789,546 B2 * 9/2020 Krishnamurthy ..... G06F 40/295
10,796,095 B2   10/2020 Chhaya et al.
10,825,219 B2 * 11/2020 Fu ......................... G06V 40/16

OTHER PUBLICATIONS

Singh et al, A multimodal hierarchical approach to speech emotion recognition from audio and text, Knowledge-based systems 229, Jul. 22, 2021, pp. 1-17 (Year: 2021).*

(Continued)

*Primary Examiner* — Linda Wong
(74) *Attorney, Agent, or Firm* — Kilpatrick Townsend & Stockton LLP

(57) ABSTRACT

Certain embodiments involve using a gated convolutional encoder-decoder framework for applying affective characteristic labels to input text. For example, a method for identifying an affect label of text with a gated convolutional encoder-decoder model includes receiving, at a supervised classification engine, extracted linguistic features of an input text and a latent representation of an input text. The method also includes predicting, by the supervised classification engine, an affect characterization of the input text using the extracted linguistic features and the latent representation. Predicting the affect characterization includes normalizing and concatenating a linguistic feature representation generated from the extracted linguistic features with the latent representation to generate an appended latent representation. The method also includes identifying, by a gated convolutional encoder-decoder model, an affect label of the input text using the predicted affect characterization.

20 Claims, 6 Drawing Sheets

(51) Int. Cl.
    *G06N 3/04*     (2023.01)
    *G06F 40/279*     (2020.01)
    *G06F 40/10*     (2020.01)
    *G06N 20/00*     (2019.01)

(58) Field of Classification Search
    CPC ......... G06F 40/289; G06F 40/30; G06N 3/04; G06N 3/08; G06N 20/00; G06N 3/045; G06N 3/084; G06N 3/088
    See application file for complete search history.

(56) References Cited

OTHER PUBLICATIONS

Yoon et al, Multimodal Speech Emotion Recognition Using Audio and Text, Oct. 10, 2018, https://arxiv.org/abs/1810.04635, pp. 1-7 (Year: 2018).*

Kim et al, Affective Latent Representation of Acoustic and Lexical Features for Emotion Recognition, Sensors, May 4, 2020, pp. 1-12 (Year: 2020).*

Zhou et al, Emotion Intensity and Its Control for Emotional Voice Conversion, IEEE Transactions on Affective Computing, vol. 14, No. 1, Jan.-Mar. 2023, pp. 31-48 (Year: 2023).*

Eskimez et al, Unsupervised Learning Approach to Feature analysis for automatic speech emotion recognition, ICASSP 2018, pp. 5099-5103 (Year: 2018).*

U.S. Appl. No. 16/224,501 , "Notice of Allowance", dated May 17, 2022, 10 pages.

Chen et al., "Inducing Target-Specific Latent Structures for Aspect Sentiment Classification", Proceedings of the 2020 Conference on Empirical Methods in Natural Language Processing (EMNLP), Nov. 20, 2020, pp. 5596-5607.

Chhaya et al., "Frustrated, Polite or Formal: Frustrated, Polite or Formal: Quantifying Feelings and Tone in Emails", Conference: Proceedings of the Second Workshop on Computational Modeling of People's Opinions, Personality, and Emotions in Social Media, Jun. 2018, pp. 76-86.

Cohen , "Enron Email Dataset", Available online at: https://www.cs.cmu.edu/~enron/, May 7, 2015, 2 pages.

Dauphin et al., "Language Modeling With Gated Convolutional Networks", ICML 2017, arXiv:1612.08083v3, Sep. 2017, 9 pages.

Fei et al., "Topic-Enhanced Capsule Network for Multi-Label Emotion Classification", IEEE/ACM Transactions on Audio, Speech, and Language Processing, vol. 28, Jun. 10, 2020, pp. 1839-1848.

Kim et al., "Affective Latent Representation of Acoustic and Lexical Features for Emotion Recognition", Sensors, vol. 20, No. 9, May 4, 2020, 12 pages.

Liu et al., "Temporal Attention Convolutional Network for Speech Emotion Recognition with Latent Representation", Interspeech, Oct. 29, 2020, pp. 2337-2341.

Mao et al., "Learning Salient Features for Speech Emotion Recognition Using Convolutional Neural Networks", IEEE Transactions on Multimedia, vol. 16, No. 8, Sep. 24, 2014, pp. 2203-2213.

Mohammad et al., "NRC-Canada: Building the State-of-the-Art in Sentiment Analysis of Tweets", Second Joint Conference on Lexical and Computational Semantics (*SEM), vol. 2, Seventh International Workshop on Semantic Evaluation (SemEval2013),, Jun. 14-15, 2013, pp. 321-327.

Pennebaker et al., "Linguistic inquiry and word count: LIWC 2015", Mahway: Operator's Manual, Lawrence Erlbaum Associates 71.2001, 2001, pp. 1-22.

Poria et al., "A Deeper Look Into Sarcastic Tweets Using Deep Convolutional Neural Networks", arXiv:1610.08815v2, Jul. 27, 2017, 13 pages.

Radford et al., "Unsupervised Representation Learning With Deep Convolutional Generative Adversarial Networks", Under review as a conference paper at ICLR 2016, arXiv:1511.06434v2, Jan. 7, 2016, pp. 1-16.

Shen et al., "Neural Language Modeling by Jointly Learning Syntax and Lexicon", arXiv:1711.02013v2, Feb. 2018, 18 pages.

Tan et al., "Learning Complex Spectral Mapping With Gated Convolutional Recurrent Networks for Monaural Speech Enhancement", IEEE/ACM Transactions on Audio, Speech, and Language Processing, vol. 28, Nov. 22, 2019, pp. 380-390.

Watson , "Tone Analyzer", Available Online at https://www.ibm.com/watson/services/toneanalyzer/, Apr. 21, 2019, pp. 1-7.

Zhang et al., "Deconvolutional Paragraph Representation Learning", NIPS, 2017, 11 pages.

Zhang et al., "Gated Neural Networks for Targeted Sentiment Analysis", Proceedings Thirtieth AAAI Conference Artificial Intelligence, 2016, pp. 3087-3093.

* cited by examiner

DETECTING AFFECTIVE CHARACTERISTICS OF TEXT WITH GATED CONVOLUTIONAL ENCODER-DECODER FRAMEWORK

CROSS-REFERENCE TO RELATED APPLICATIONS

This application is a Continuation of U.S. application Ser. No. 16/224,501, filed Dec. 18, 2018, and entitled "Detecting Affective Characteristics of Text With Gated Convolutional Encoder-Decoder Framework," the content of which is incorporated herein by reference.

TECHNICAL FIELD

This disclosure relates generally to machine-learning techniques. More specifically, but not by way of limitation, this disclosure relates to using a gated convolutional encoder-decoder framework for applying affective characteristic labels to input text.

BACKGROUND

Human expressions, such as written or verbal communication, typically include both a factual component and a non-factual component. The human expressions are sometimes analyzed to detect the non-factual component as a method to determine an effectiveness of delivering the factual component of the expression. Personalization of websites, targeted communications, and targeted marketing materials all rely on an accurate characterization of the non-factual component of the human expression. Analysis of the non-factual component using machine-learning techniques is useful to filter expressions that are provided to a target. In one example, the analysis provided by a machine-learning technique provides an indication that the non-factual component of an analyzed human expression is not appropriate for a specific target group because the non-factual component lacks an affective characteristic that is particularly relevant to the target group. In such an example, the affective characteristic identified by the machine-learning technique indicates that the human expression is too informal for a communication targeted to a business acquaintance or too formal for a communication targeted to a teenager.

A machine-learning technique described herein is able to address issues associated with unreliable or inaccurate characterizations of human expressions by providing consistent and efficient characterization results based on a trained model. Existing analysis techniques that rely on a team of individuals to manually monitor human expressions for fine-grained affective characteristics generally amplify the reliability and inaccuracy issues. In an example, the affective characteristics identified by the team of individuals are tagged and curated manually. In such an example, each individual may manually identify the affective characteristics differently based on differing subjective natures of the individuals. Thus, the same standard is not applied when tagging and curating human expressions across the team of individuals. Further, tagging and curating the expressions manually provides an inefficient mechanism for characterization of the expressions in comparison to the machine-learning technique described herein.

The challenges associated with manually identifying and assigning the affective characteristics to content also limit an effectiveness of supervised learning algorithms used to identify affective characteristics in the content. That is, the tedious nature of analyzing the content for affective characteristics limits an amount of ground-truth datasets that are available to effectively train the supervised learning algorithms. Moreover, the subjective nature of the human reactions limits consistency and accuracy of the ground-truth datasets that are available for training the supervised learning algorithms.

SUMMARY

Certain embodiments involve using a gated convolutional encoder-decoder framework for applying affective characteristic labels to input text. For example, a method for identifying an affect label of text with a gated convolutional encoder-decoder model includes receiving, at a supervised classification engine, extracted linguistic features of an input text and a latent representation of an input text. The method also includes predicting, by the supervised classification engine, an affect characterization of the input text using the extracted linguistic features and the latent representation. Predicting the affect characterization includes normalizing and concatenating a linguistic feature representation generated from the extracted linguistic features with the latent representation to generate an appended latent representation. The method also includes identifying, by a gated convolutional encoder-decoder model, an affect label of the input text using the predicted affect characterization.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
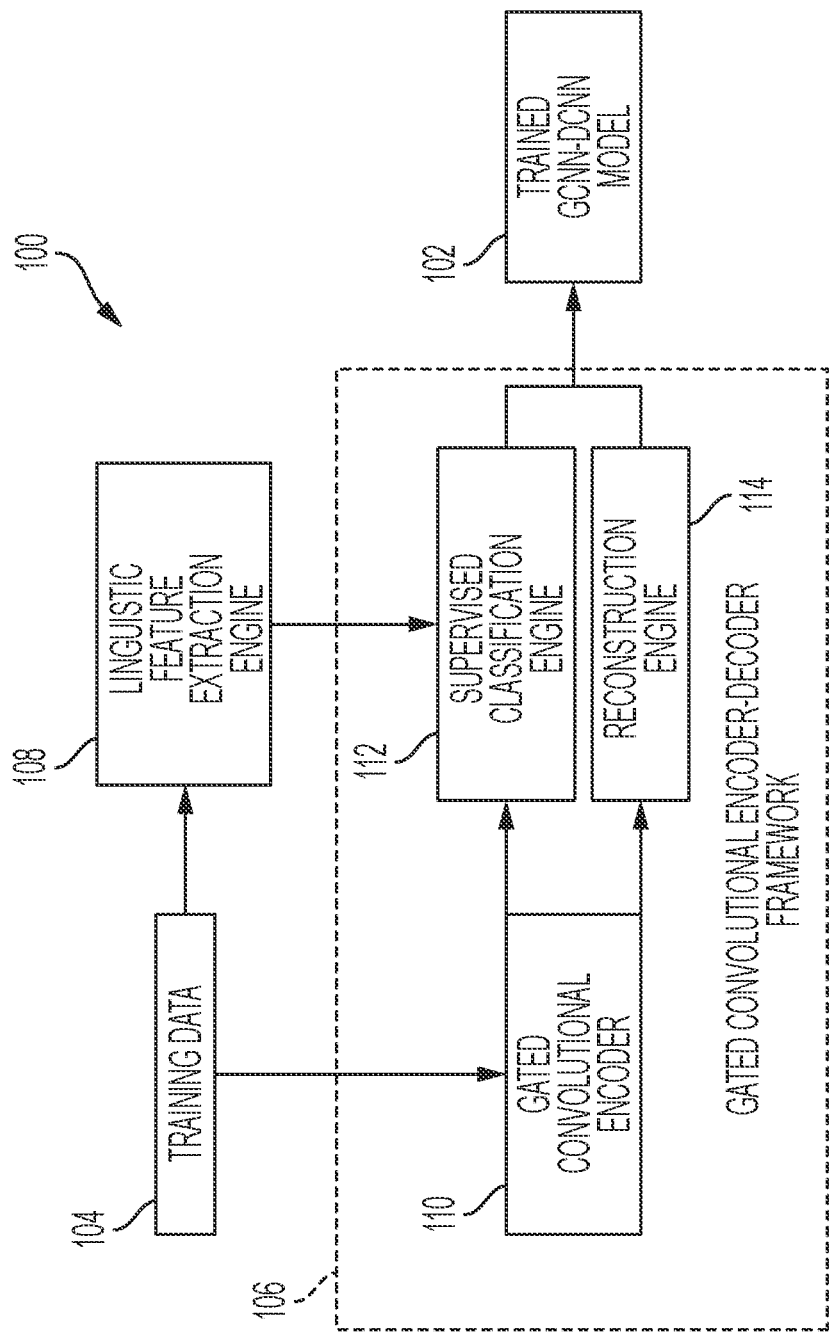
FIG. 1 depicts an example of a computing environment for training a gated convolutional encoder-decoder model, according to certain embodiments of the present disclosure.

Certain embodiments of the present disclosure involve using a gated convolutional encoder-decoder framework for applying affective characteristic labels to input text. A machine-learning technique described herein is able to address issues associated with unreliable or inaccurate characterizations of human expressions by providing consistent and efficient characterization results based on a gated convolutional encoder-decoder model. As explained above, conventional solutions for tagging input text with affective characteristic labels involve deficiencies associated with individuals manually identifying the affective characteristics of the text. Because manual tagging of input text involves identification of the affective characteristic and input of the affective characteristic label from an individual, the input text often goes untagged due to a large volume of content. In one or more examples, the input text is also often tagged with an affective characteristic that is inaccurate due to the subjective nature of a human interaction with the input text. Certain embodiments described herein address this issue by, for example, automatically identifying and assigning affective characteristic labels for the input text using the gated convolutional encoder-decoder model. The affective characteristic labels identify non-factual components (e.g., a tone) of the input text to provide an indication to a user that the input text is suitable for delivery to a targeted audience.

For instance, the gated convolutional encoder-decoder model described herein is trained to identify affective characteristics of input text based on a concatenation of an encoded latent representation of the input text with linguistic features detected within the input text. By automatically identifying the affective characteristics of the input text, the gated convolutional encoder-decoder model assigns one or more affective characteristic labels to each set of input text received at the gated convolutional encoder-decoder model. This automatic assignment of the affective characteristic labels improves affective characteristic label assignment rates and improves accuracy of the affective characteristic labels as compared to certain conventional solutions described above. Further, assigning the affective characteristic labels to the input text enables third party systems to customize or redirect the input text such that the input text exhibits additional or alternative affective characteristics that are more closely associated with a targeted audience of the input text.

The following non-limiting example is provided to introduce certain embodiments. In this example, a computing system executes a gated convolutional encoder-decoder model to assign affective characteristic labels to input text based on a latent representation of the input text and linguistic features of the input text. The gated convolutional encoder-decoder model receives input text at a gated convolutional encoder. An example of the input text is an email directed at a targeted audience.

In the example, the gated convolutional encoder encodes the input text to generate a latent representation of the input text. The latent representation of the input text is a fixed-length vector that provides a succinct representation of the input text. A linguistic feature extraction engine also receives the input text and extracts linguistic features from the input text. Examples of the extracted linguistic features include lexical features, syntactic features, derived features, and psycholinguistic features of the input text. These linguistic features are arranged in the form of a linguistic feature vector.

The latent representation of the input text and the extracted linguistic features of the input text are each provided to a supervised classification engine. In the example, the supervised classification engine concatenates the latent representation of the input text and the extracted linguistic features to generate an appended latent representation of the input text. The appended latent representation of the input text provides a representation of both the factual content of the input text and the non-factual content of the input text.

Based on the appended latent representation (i.e., a combined representation of both the latent representation and the extracted linguistic features), the supervised classification engine predicts an affect characterization of the input text. In an example, the affect characterization of the input text represents a predominant non-factual component of the input text. For example, if the input text is an email directed to a business acquaintance, the affect characterization is identified as a "formal" affect characterization. Based on this predicted affect characterization, the gated encoder-decoder model identifies an affect label of the input text. The affect label enables an additional system to modify the input text for effective delivery of the factual content of the input text to other targeted audiences (e.g., to modify the input text to an informal affect characterization for delivery to teenagers or to a formal affect characterization for delivery to business acquaintances). Further, the affect label functions as a backstop to ensure that non-factual components of the input text are suitable for a targeted audience prior to delivering the input text to the target audience.

As used herein, the term "gated convolutional encoder-decoder model" is used to refer to a trained model that receives input text and assigns an affect label to the input text. In an example, the gated convolutional encoder-decoder model (GCNN-DCNN model) is jointly trained by minimizing losses associated with a reconstruction engine and a supervised classification engine.

As used herein, the term "gated convolutional encoder-decoder framework" is used to refer to a data manipulation framework used to train the GCNN-DCNN model. In an example, gated convolutional encoder-decoder framework includes a gated convolutional encoder that encodes training data into a latent representation, a reconstruction engine that decodes the latent representation to reconstruct the training data, and a supervised classification engine that combines the latent representation of the training data with linguistic features of the training data to predict an affect characterization of the training data.

As used herein, the term "training data" is used to refer to data input to the gated convolutional encoder-decoder framework to train the GCNN-DCNN model. In an example, the training data includes a set of text segments where one or more of the text segments have been assigned an affect characterization label by an individual. The affect characterization label of the set of text segments is used in conjunction with linguistic features extracted from the text segments to minimize classification loss of the supervised classification engine.

Certain embodiments described herein facilitate assignment of affective characteristic labels to text input. The affective characteristic labels assigned to text input provide an indication of a non-factual component associated with the text input. Thus, the affective characteristic labels assigned to the text input provide a mechanism for verification that the non-factual component of the text input is suitable for a targeted audience. Further, the automatic assignment of affective characteristic labels to the text input improves a way that a computer is able to sort and store received text input in a memory and to enable efficient retrieval of the text input associated with a particular affective characteristic.

Example of an Operating Environment for Training a Model and Assigning Affect Labels to Input Text Referring now to the drawings, FIG. 1 depicts an example of a computing environment 100 for training a gated convolutional encoder-decoder model (GCNN-DCNN model) 102 based on training data 104 received by a gated convolutional encoder-decoder framework (GCNN-DCNN framework) 106. The computing environment 100 also includes a linguistic feature extraction engine 108, which is executed by one or more computing devices to extract linguistic features from the training data 104 and to provide the extracted linguistic features to the GCNN-DCNN framework 106. The GCNN-DCNN framework 106 includes a gated convolutional encoder 110, a supervised classification engine 112, and a reconstruction engine 114.

The gated GCNN-DCNN framework 106 receives the training data 104 at the gated convolution encoder 110. In an example, the training data 104 includes a set of text segments where one or more segments have been assigned an affect characterization label by an individual. The affect characterization label provides an indication of an affect characteristic that each of the text segments of the set of text segments represents. In one or more examples, the affect characteristics include an indication that the text segments represent a formal communication, a frustrated communication, a polite communication, or any other affect characteristic that is capable of characterizing the text segment.

The gated convolutional encoder 110 encodes the training data 104 to generate a latent representation of the training data 104. In an example, the gated convolutional encoder 110 is a multi-layer convolutional encoder with output gates at one or more of the layers that control an amount of information that propagates through the convolutional layers of the gated convolutional encoder 110. The convolutional layers of the gated convolutional encoder 110 create a feature map that is fed into a fully-connected layer of the gated convolutional encoder 110 to generate the latent representation of the training data 104. In one or more examples, the latent representation of the training data 104 is used as an element to train the GCNN-DCNN model 102.

For example, the reconstruction engine 114 is pre-trained to generate a reproduction of the training data 104 from the latent representation. During the pre-training process of the reconstruction engine 114, the reproduction of the training data 104 is compared to the original training data 104 to generate an auto-encoder loss value. The pre-training process of the reconstruction engine 114 allows the reconstruction engine 114 to learn text sequences and to minimize the auto-encoder loss value. Further, because the reconstruction engine 114 outputs a reproduction of the training data 104, the training data 104 used during the pre-training process may be training data 104 that is not labeled with an affect characterization. Accordingly, the training data 104 with an affect label may be saved for training of the GCNN-DCNN model 102 when the training relies on a comparison of a predicted affect characterization of the training data 104 with a ground-truth affect label of the training data 104.

When pre-training of the reconstruction engine 114 is complete, joint training of the GCNN-DCNN model 102 commences. Join training of the GCNN-DCNN model 102 uses weighted loss values of both the reconstruction engine 114 and the supervised classification engine 112 to train the GCNN-DCNN model 102 to generate accurate affect characterization predictions of input text and accurate reproductions of the input text. In an example, the supervised classification engine 112 receives the latent representation of the training data 104 from the gated convolutional encoder 110. The supervised classification engine 112 also receives the extracted linguistic features of the training data 104 from the linguistic feature extraction engine 108. Upon receipt of the latent representation and the extracted linguistic features, the supervised classification engine 112 concatenates the latent representation with the extracted linguistic features and generates a predicted affect characterization of the training data 104. Because the training data 104 is labeled with an affect characterization, a classification loss is determined based on a difference between the predicted affect characterization and the labeled affect characterization of the training data 104.

To train the GCNN-DCNN model 102, weights are assigned to the classification loss and the auto-encoder loss of the supervised classification engine 112 and the reconstruction engine 114, respectively. In an example, the classification loss and the auto-encoder loss are weighted equally such that the classification loss is not minimized at the expense of the auto-encoder loss, and vice versa. The weights of the classification loss and the auto-encoder loss may be adjusted based on specific circumstances surrounding the training of the GCNN-DCNN model 102. For example, an accurate affect characterization prediction of an input text may be a greater priority than an accurate reproduction of the input text. Accordingly, the classification loss will include a greater weight than the auto-encoder loss. In this manner, the GCNN-DCNN model 102 is trained jointly using the supervised classification engine 112 and the reconstruction engine 114.

In a training stage of the GCNN-DCNN model 102, an objective for a training process is to adjust the weight parameters (e.g., the classification loss weight parameter and the auto-encoder loss weight parameter) of the GCNN-DCNN model 102 such that a total loss of the GCNN-DCNN model 102 is minimized. In an example, the total loss of the GCNN-DCNN model 102 is a combination of the classification loss and the auto-encoder loss. In such an example, gradients are computed for the total loss at each step of the training stage of the GCNN-DCNN model 102 with respect to each of the weight parameters in the model. The gradients are then used to adjust the weight parameters. In one or more examples, this adjustment of the weight parameters is accomplished using a backpropagation algorithm used to train neural network based architectures.

Figure 2:
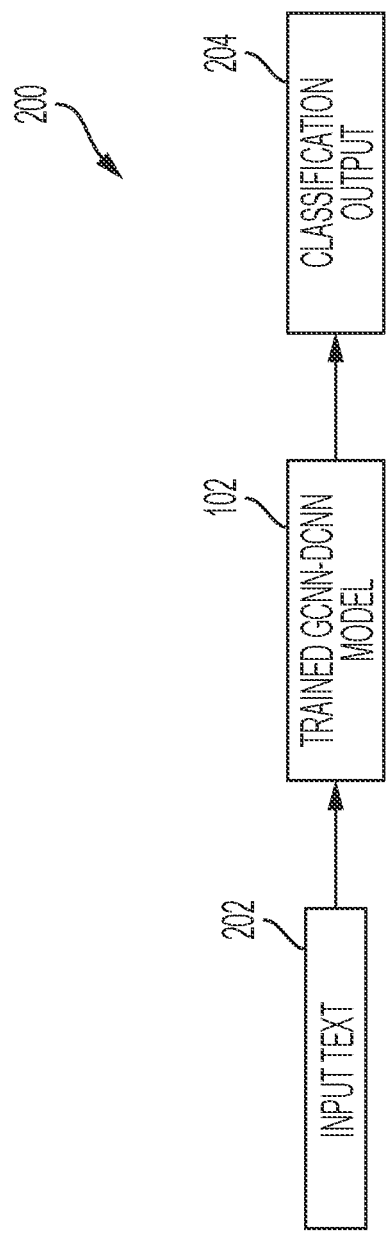
FIG. 2 depicts an example of a computing environment for assigning affect classifications to input text using the gated convolutional encoder-decoder model of FIG. 1, according to certain embodiments of the present disclosure.

FIG. 2 depicts an example of a computing environment 200 for assigning affect classifications to input text 202 using the GCNN-DCNN model 102. In an example, the input text 202 is any text segment where affect characterization is desirable. For example, the input text 202 may be an email, a marketing copy, or any other written text where the affect characterization is useful. In an example, the affect characterization helps a drafter of the input text 202 adjust the content of the input text 202 to have a positive impact on a targeted audience. In an embodiment, an informal affect characterization of the input text 202 may be beneficial when the input text 202 is targeted at a teenager, while a formal affect characterization of the input text 202 may be beneficial when the input text 202 is targeted at a business relationship. Accordingly, the input text 202 is adjusted to match a most effective affect characterization for a target audience.

When the input text 202 is received by the GCNN-DCNN model 102, the GCNN-DCNN model 102 generates an affect characterization of the input text 202 using the linguistic features of the input text 202. The affect characterization is assigned to the input text 202 as a classification output 204. In an example, the classification output 204 is an affect label stored with the input text 202. The affect label is usable to efficiently store and retrieve the input text 202 within a memory of the computing environment 200. Further, the affect label provides an operator of the GCNN-DCNN model 102 with confirmation that the affect characteristic of the input text 202 is or is not appropriate for a targeted audience of the input text 202.

The input text 202 provided to the GCNN-DCNN model 102 includes a factual component and a non-factual component. The non-factual component, such as linguistic features of the input text 202, is used by the GCNN-DCNN model 102 to identify the affect characteristic of the input text 202. In an example, the identified affect characteristic is then assigned to the input text 202 as the affect label.

Examples of Determining and Assigning an Affect Label

Figure 3:
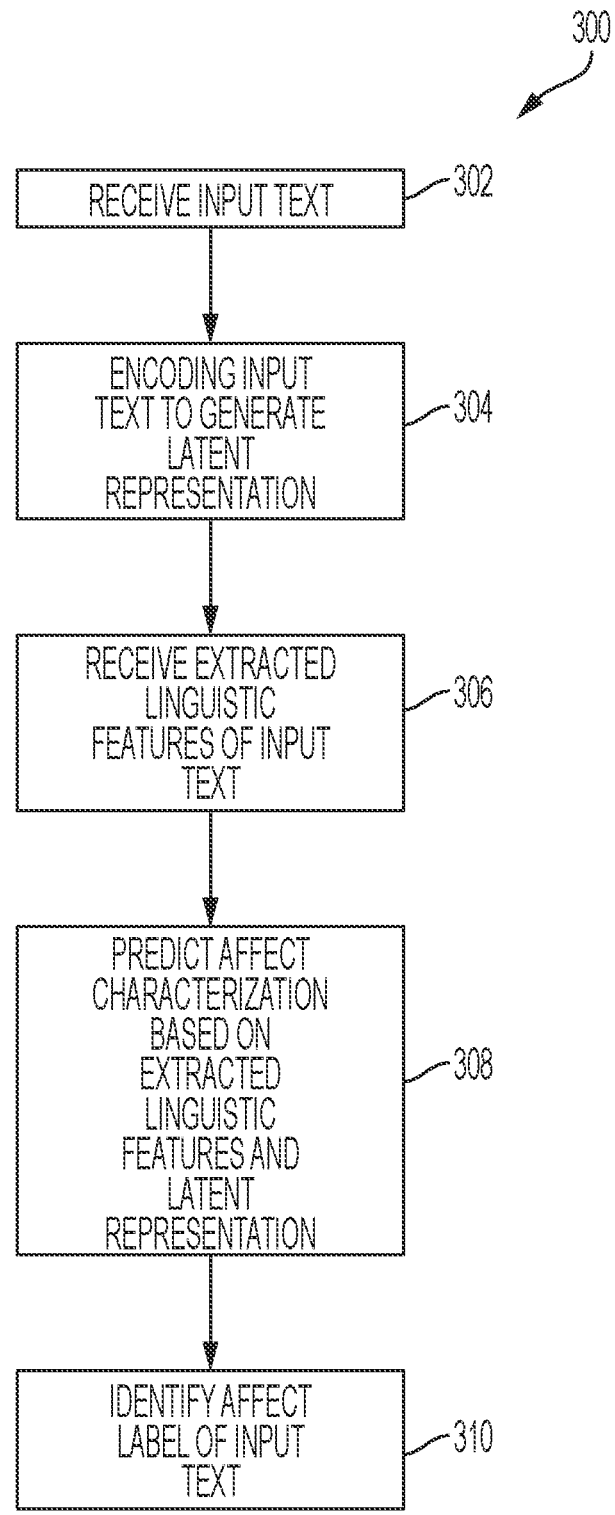
FIG. 3 depicts an example of a process for using the gated convolutional encoder-decoder model of FIG. 1 to assign affect classifications to input text, according to certain embodiments of the present disclosure.

FIG. 3 depicts an example of a process 300 using the GCNN-DCNN model 102 to assign affect classifications to the input text 202. One or more processing devices implement operations depicted in FIG. 3 by executing suitable program code (e.g., the GCNN-DCNN model 102). For illustrative purposes, the process 300 is described with reference to certain examples depicted in the figures. Other implementations, however, are possible.

At block 302, the process 300 involves receiving the input text 202 at the GCNN-DCNN model 102. One or more processing devices execute the GCNN-DCNN model 102 (or suitable other program code) to implement block 302. For instance, executing the GCNN-DCNN model 102 causes one or more processing devices to receive or otherwise access the input text 202 that is stored in a non-transitory computer-readable medium. In some embodiments, receiving or accessing the input text 202 involves communicating, via a data bus, suitable signals between a local non-transitory computer-readable medium and the processing device. In additional or alternative embodiments, receiving or accessing the input text 202 involves communicating, via a data network, suitable signals between a computing system that includes the non-transitory computer-readable medium and a computing system that includes the processing device. Examples of the input text 202 include text segments from emails, marketing copy, or any other segments of text where an affect characterization of the input text 202 is desirable.

At block 304, the process 300 involves encoding the input text 202 using the gated convolutional encoder 110 to generate a latent representation of the input text 202. One or more processing devices execute the gated convolutional encoder 110 (or other suitable program code) to implement block 304. In an example, the input text 202 is encoded into the latent representation of the input text 202. The latent representation of the input text 202 is a fixed-length vector that represents all of the text of the input text 202. The fixed-length vector functions as a summarization of the input text 202.

At block 306, the process 300 involves receiving extracted linguistic features of the input text 202 at the supervised classification engine 112. One or more processing devices execute the supervised classification engine 112 and the linguistic feature extraction engine 108 (or other suitable program code) to implement block 306. In an example, the linguistic feature extraction engine 108 receives the input text 202, and the linguistic feature extraction engine 108 extracts linguistic features from the input text 202. The supervised classification engine 112 causes one or more processing devices to receive or otherwise access the linguistic features that are stored in a non-transitory computer-readable medium associated with the linguistic feature extraction engine 108. In some embodiments, receiving or accessing the linguistic features involves communicating, via a data bus, suitable signals between a local non-transitory computer-readable medium and the processing device. In additional or alternative embodiments, receiving or accessing the linguistic features involves communicating, via a data network, suitable signals between a computing system that includes the non-transitory computer-readable medium and a computing system that includes the processing device. Examples of the linguistic features include lexical features, syntactic features, derived features, and psycholinguistic features of the input text 202, and the linguistic features are arranged as a linguistic feature vector.

At block 308, the process 300 involves predicting an affect characterization of the input text 202 based on the extracted linguistic features and the latent representation of the input text 202. One or more processing devices execute the supervised classification engine 112 (or other suitable program code) to implement block 308. The linguistic features are concatenated with the latent representation by the supervised classification engine 112 to generate an appended latent representation. Using the appended latent representation, the supervised classification engine 112 predicts an affect characterization of the input text 202.

At block 310, the process 300 involves identifying and assigning affect labels to the input text 202 using the GCNN-DCNN model 102. One or more processing devices execute the GCNN-DCNN model 102 (or other suitable program code) to implement block 310. The GCNN-DCNN model 102 identifies the affect labels for the input text 202 based on the affect characterization predicted at block 308. In an example, the affect labels provide an indication of a predicted affect characterization of the input text 202.

Figure 4:
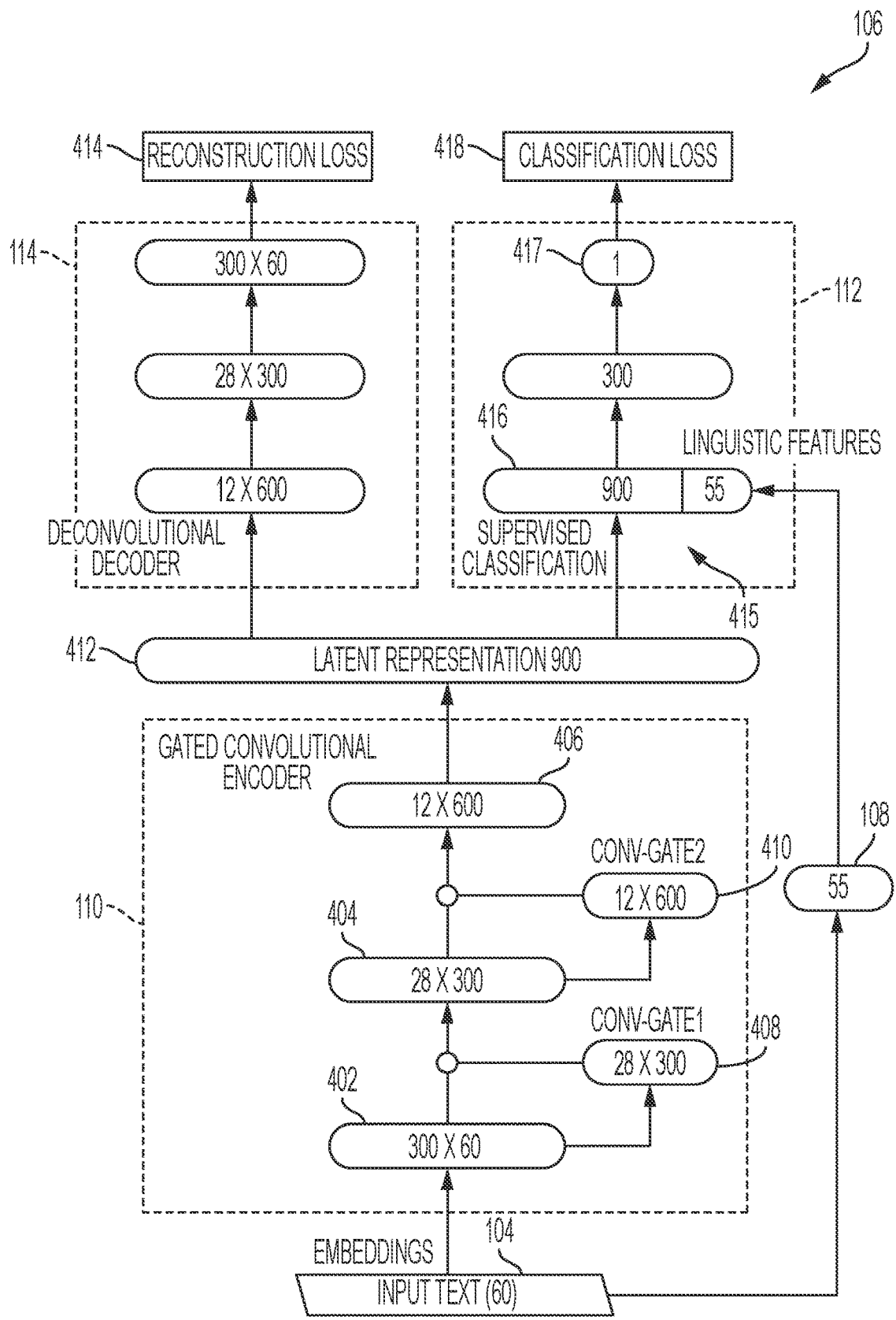
FIG. 4 depicts a diagram of a gated convolutional encoder-decoder framework, according to certain embodiments of the present disclosure.

FIG. 4 depicts a diagram of the GCNN-DCNN framework 106. In the GCNN-DCNN framework 106, the training data 104 is initially received at the gated convolutional encoder 110. Examples of the training data 104 include text segments that have been manually tagged with affect labels and text segments that have not been tagged with the affect labels. In an embodiment, the unlabeled training data 104 is used during pre-training of the reconstruction engine 114, while the labeled training data 104 is used during the joint training of the trained convolutional GCNN-DCNN model 102. In such an embodiment, training data 104 may be emails, marketing copy, or any other segments of text that include or do not include the affect labels.

Initially, the training data 104 is unlabeled due to the relatively large quantity of unlabeled training data available in comparison to the labeled training data. Further, because an affect characterization is not used in pre-training the reconstruction engine 114, no advantage is gained by using the labeled training data 104. At the gated convolutional encoder 110, the training data 104 is encoded into a latent representation of the training data 104. In an example, the latent representation of the training data 104 is a fixed-length vector that represents all of the text of the training data 104. The fixed-length vector functions as a summarization of the training data 104.

As illustrated, the gated convolutional encoder 110 includes three layers 402, 404, and 406. The training data 104 may initially be represented as a k-dimensional representation of the training data 104 using the following equation:

$$e_t = E[a_d^t] \qquad \text{(Equation 1)}$$

where E is a learned matrix and $a_d^t$ represents a word of the training data 104. The k-dimensional representation (i.e., $e_t$ or the embedding layer) passes through the layers 402, 404, and 406 to generate a fixed-length vector $h_L$, which is the latent representation of the training data 104. The first layer 402 of the gated convolution encoder indicates that the training data 104 will transition to a 300×60 matrix. Matrix sizes described herein are hyperparameters that represent a size of each of the layers 402, 404, and 406. From the first layer 402, a first layer representation of the training data 104 is transmitted through a first output gate 408. The first output gate 408 controls a flow of information to a second layer representation of the training data 104, and the combined output of the first layer 402 and the first output gate 408 at the second layer 404 will be a 28×300 matrix. From the second layer 404, a second layer representation of the training data 104 is transmitted through a second output gate 410. The second output gate 410 controls a flow of information to a third layer representation of the training data 104, and the combined output of the second layer 404 and the second output gate 410 at the third layer 406 will be a 12×600 matrix. Other matrix sizes and layer numbers are also contemplated. A gating function used by the output gates 408 and 410 to control the layer representations is represented by the following equation:

$$h_l(X) = (X * W_l + b_l) \otimes \sigma(X * W_g + b_g) \quad \text{(Equation 2)}$$

where X is the input, * is a convolution operation, b is a sigmoid layer, and $W_l$, $W_g$, $b_l$, and $b_g$ are learned parameters for layer l. In an example, the convolutional layer (i.e., $X*W_l+b_l$) controls a size of the next layer. Further, the output gate represented by $\sigma(X*W_g+b_g)$ is a convolutional operation (i.e., $X*W_g+b_g$) with a sigmoid layer (i.e., σ). The output gate modulates the information transferred by each element in a convolutional layer to the next layer. That is, the output gate controls information flow through layers 402, 404, and 406. Further, the output of the convolutional layer and the output of the output gate have the same dimensions (e.g., 28×300 at the layer 404 and 12×600 at the layer 406. The result of Equation 2 is a latent representation 412 of the training data 104.

Using the latent representation 412 of the training data 104, the reconstruction engine 114 is trained to reconstruct the training data 104 (e.g., to decode the training data 104). In an example, the output gates 408 and 410 are not included in the reconstruction engine 114 because the latent representation 412 is self-sufficient for decoding (i.e., reconstruction of the training data 104). An accuracy of the reconstruction of the training data 104 is represented by an auto-encoder loss 414, and the auto-encoder loss 414 is determined based on a difference between the reconstruction of the training data 104 and the original training data 104 used to generate the latent representation 412. Pre-training the reconstruction engine 114 involves minimizing or otherwise reducing the auto-encoder loss 414 of the reconstruction engine 114 by adjusting the learned parameters $W_l$, $W_g$, $b_l$, and $b_g$ of Equation 2. This enables leveraging of the training data 104 that is unlabeled for the reconstruction engine 114 to learn enhanced reconstruction representations in an unsupervised manner. In an example, the auto-encoder loss 414 is represented by the following equation:

$$L_{ae} = \Sigma_d \in D \Sigma_t (\log p(\hat{a}^t_d = a^t_d)) \quad \text{(Equation 3)}$$

where D is the set of observed sentences, and $\hat{a}^t_d$ and $a^t_d$ correspond to the words of the training data 104 and the reconstructed training data 104, respectively.

After pre-training the reconstruction engine 114, the GCNN-DCNN model 102 is jointly trained with the reconstruction engine 114 and the supervised classification engine 112. In an example, the training data 104 including an affect label is received at the gated convolutional encoder 110, and the gated convolutional encoder 110 generates a latent representation 412 of the training data 104. The latent representation 412 is provided to a set of fully connected layers 415 of the supervised classification engine 112 with a Softmax classifier loss layer 417 to generate a predicted affect classification of the training data. The linguistic feature extraction engine 108 also receives the training data 104, and the linguistic feature extraction engine 108 extracts linguistic features from the training data 104. In the illustrated example, the linguistic feature extraction engine 108 extracts 55 linguistic elements from the training data 104 as a linguistic feature vector. The linguistic feature vector is concatenated with the latent representation 412 to generate an appended latent representation 416. Using the appended latent representation 416, the supervised classification engine 112 is trained to predict an affect characterization of the training data 104 based on the linguistic features of the training data 104. The prediction of the affect characterization is cross-verified using the affect label (i.e., a ground-truth label) assigned to the training data 104. An accuracy of the predicted affect characterization of the supervised classification engine 112 is represented by a classification loss 418, and the classification loss 418 is determined based on a difference between the predicted affect characterization of the training data 104 and the ground-truth label of training data 104. The classification loss 418 is represented by the following equation:

$$L_c = -(y*\log(p) + (1-y)*\log(1-p)) \quad \text{(Equation 4)}$$

where p is a probability corresponding to a positive match with a ground-truth table y.

In an example, the GCNN-DCNN model 102 is trained based on minimizing the auto-encoder loss 414 of the reconstruction engine 114 and minimizing the classification loss 418 of the supervised classification engine 112. As mentioned above with respect to FIG. 1, weights are assigned to the classification loss 418 and the auto-encoder loss 414 of the supervised classification engine 112 and the reconstruction engine 114, respectively. During joint training of the GCNN-DCNN model 102, the classification loss 418 and the auto-encoder loss 414 are weighted equally such that the classification loss 418 is not minimized at the expense of the auto-encoder loss 414, and vice versa. The weights of the classification loss 418 and the auto-encoder loss 414 may be adjusted based on specific circumstances surrounding the training of the GCNN-DCNN model 102. For example, an accurate affect characterization prediction of the input text 202 may be a greater priority than an accurate reproduction of the input text 202. In such an example, the classification loss 418 will include a greater weight than the auto-encoder loss 414. Accordingly, the GCNN-DCNN model 102 is trained by adjusting the learned parameters $W_l$, $W_g$, $b_l$, and $b_g$ of Equation 2 to focus on minimizing the classification loss 418 and the auto-encoder loss 414 using the weights applied to the classification loss 418 and the auto-encoder loss 414.

Figure 5:
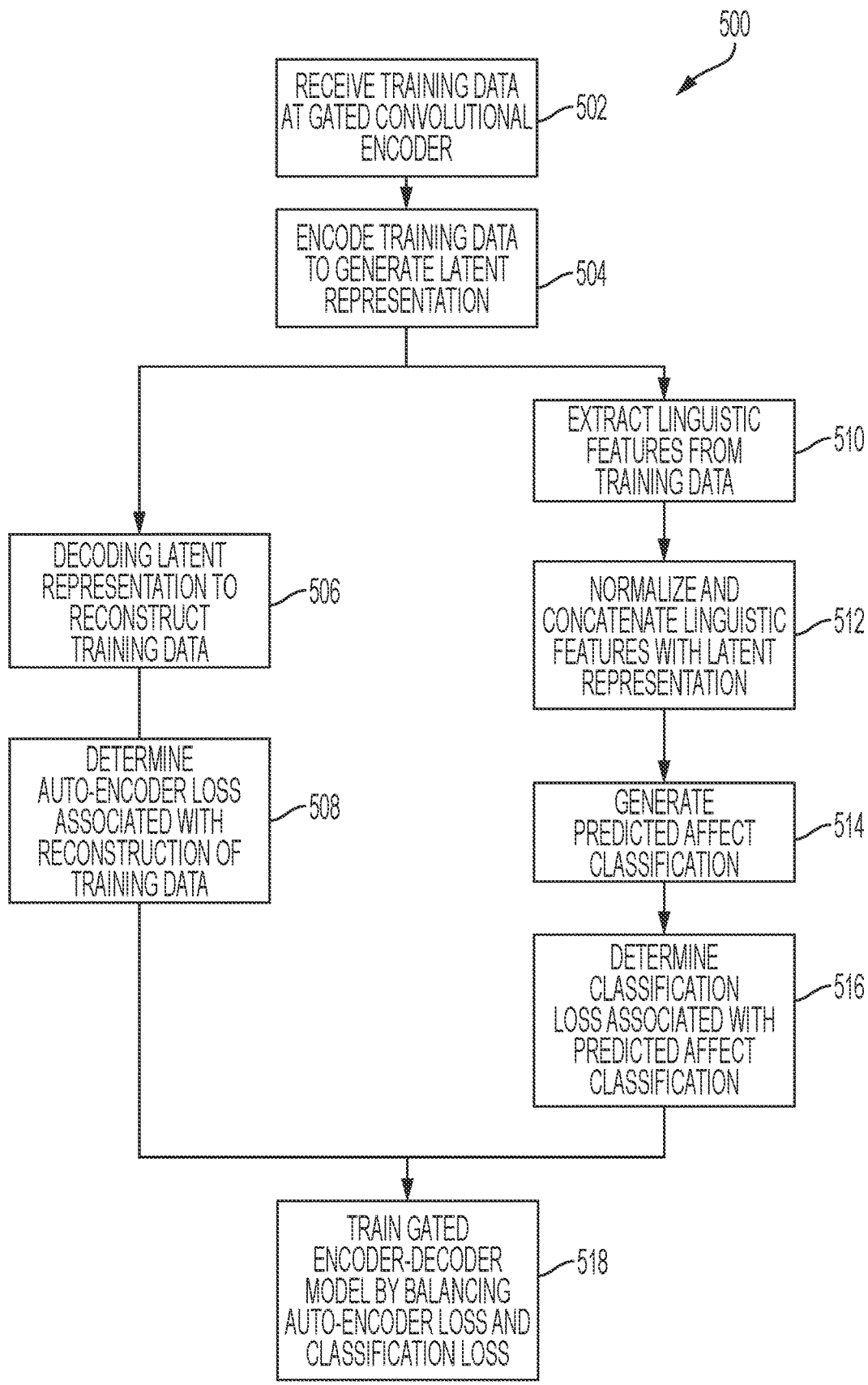
FIG. 5 depicts an example of a process for training the gated convolutional encoder-decoder model of FIG. 1, according to certain embodiments of the present disclosure.

FIG. 5 depicts an example of a process 500 for training the GCNN-DCNN model 102 based on the training data 104. One or more processing devices implement operations depicted in FIG. 5 by executing suitable program code (e.g., the GCNN-DCNN framework 106 and the GCNN-DCNN model 102). For illustrative purposes, the process 500 is described with reference to certain examples depicted in the figures. Other implementations, however, are possible.

At block 502, the process 500 involves receiving the training data 104 at the gated convolutional encoder 110 of the GCNN-DCNN framework 106. One or more processing devices execute the GCNN-DCNN framework 106 (or suitable other program code) to implement block 502. For instance, executing the GCNN-DCNN framework 106 causes one or more processing devices to receive or otherwise access the training data 104 that is stored in a non-transitory computer-readable medium. In some embodiments, receiving or accessing the training data 104 involves communicating, via a data bus, suitable signals between a local non-transitory computer-readable medium and the processing device. In additional or alternative embodiments, receiving or accessing the training data 104 involves communicating, via a data network, suitable signals between a computing system that includes the non-transitory computer-readable medium and a computing system that includes the processing device.

At block 504, the process 500 involves encoding the training data 104 to generate the latent representation 412. One or more processing devices execute the gated convolutional encoder 110 (or other suitable program code) to implement block 504. The gated convolutional encoder 110 of the GCNN-DCNN framework 106 receives the training data 104 and encodes the training data 104 into the latent representation 412 of the training data 104. In an example, the latent representation 412 of the training data 104 is a fixed-length vector that represents all of the text of the training data 104. The fixed-length vector functions as a summarization of the training data 104.

At block 506, the process 500 involves decoding the latent representation 412 to reconstruct the training data 104. One or more processing devices execute the reconstruction engine 114 (or other suitable program code) to implement block 506. Using the latent representation 412, the reconstruction engine 114 and the gated convolutional encoder 110 are trained to reconstruct the training data 104 (e.g., to accurately encode and decode the latent representation 412).

At block 508, the process 500 involves determining the auto-encoder loss 414 associated with reconstructing the training data 104. One or more processing devices execute the reconstruction engine 114 (or other suitable program code) to implement block 508. An accuracy of the reconstruction of the training data 104 is represented by the auto-encoder loss 414, and the auto-encoder loss 414 is determined using Equation 3, as discussed above, which is based on a difference between the reconstruction of the training data 104 and the original training data 104 used to generate the latent representation 412.

At block 510, the process 500 involves extracting linguistic features from the training data 104. One or more processing devices execute the linguistic feature extraction engine 108 (or other suitable program) to implement block 510. In an example, the training data 104 including an affect label is received at the linguistic feature extraction engine 108, and the linguistic feature extraction engine 108 extracts linguistic features from the training data 104. The linguistic features include lexical features, syntactic features, derived features, and psycholinguistic features, and the linguistic features are represented in a linguistic features vector.

At block 512, the process 500 involves normalizing and concatenating the linguistic features with the latent representation 412. One or more processing devices execute the supervised classification engine 112 (or other suitable program) to implement block 512. In an example, the linguistic features are normalized and concatenated with the latent representation 412 to generate the appended latent representation 416.

At block 514, the process 500 involves generating a predicted affect characterization of the training data 104. One or more processing devices execute the supervised classification engine 112 (or other suitable program) to implement block 514. Using the appended latent representation 416, the supervised classification engine 112 is trained to predict an affect characterization of the training data 104 based on the linguistic features of the training data 104.

At block 516, the process 500 involves determining the classification loss 418 associated with the predicted affect characterization. One or more processing devices execute the supervised classification engine 112 (or other suitable program) to implement block 516. In an example, the classification loss 418 is determined using Equation 4, as discussed above, to cross-verify the predicted affect characterization with the ground-truth label assigned to the training data 104.

At block 518, the process 500 involves training the GCNN-DCNN model 102 by balancing the auto-encoder loss 414 and the classification loss 418. One or more processing devices execute the GCNN-DCNN framework 106 (or other suitable program) to implement block 518. In an example, the GCNN-DCNN model 102 is trained based on minimizing a weighted auto-encoder loss of the reconstruction engine 114 and minimizing a weighted classification loss of the supervised classification engine 112. As mentioned above with respect to FIG. 1, weights are assigned to the classification loss 418 of the supervised classification engine 112 and the auto-encoder loss 414 of the reconstruction engine 114. In an example, the classification loss 418 and the auto-encoder loss 414 are weighted equally such that the learned parameters $W_f$, $W_g$, $b_f$, and $b_g$ of Equation 2 are not adjusted to the detriment of either the classification loss 418 or the auto-encoder loss 414. The weights of the classification loss 418 and the auto-encoder loss 414 may be adjusted based on specific circumstances surrounding the training of the GCNN-DCNN model 102. For example, an accurate affect characterization prediction of an input text 202 may be a greater priority than an accurate reproduction of the input text 202. Accordingly, the classification loss 418 will include a greater weight than the auto-encoder loss 414 when training the GCNN-DCNN model 102. In one or more examples, the total loss including the weights of the classification loss 418 and the auto-encoder loss 414 are represented by the following equation:

$$L_T = a_{ae}L_{ae} + (1-a_{ae})L_c \quad \text{(Equation 5)}$$

where $a_{ae}$ represents a weight of the auto-encoder loss on a scale of 0 to 1. In this manner, the GCNN-DCNN model 102 is trained jointly using the total loss represented by Equation 5.

Example of a Computing System for Executing a Searchable Tag Identifier Module

Figure 6:
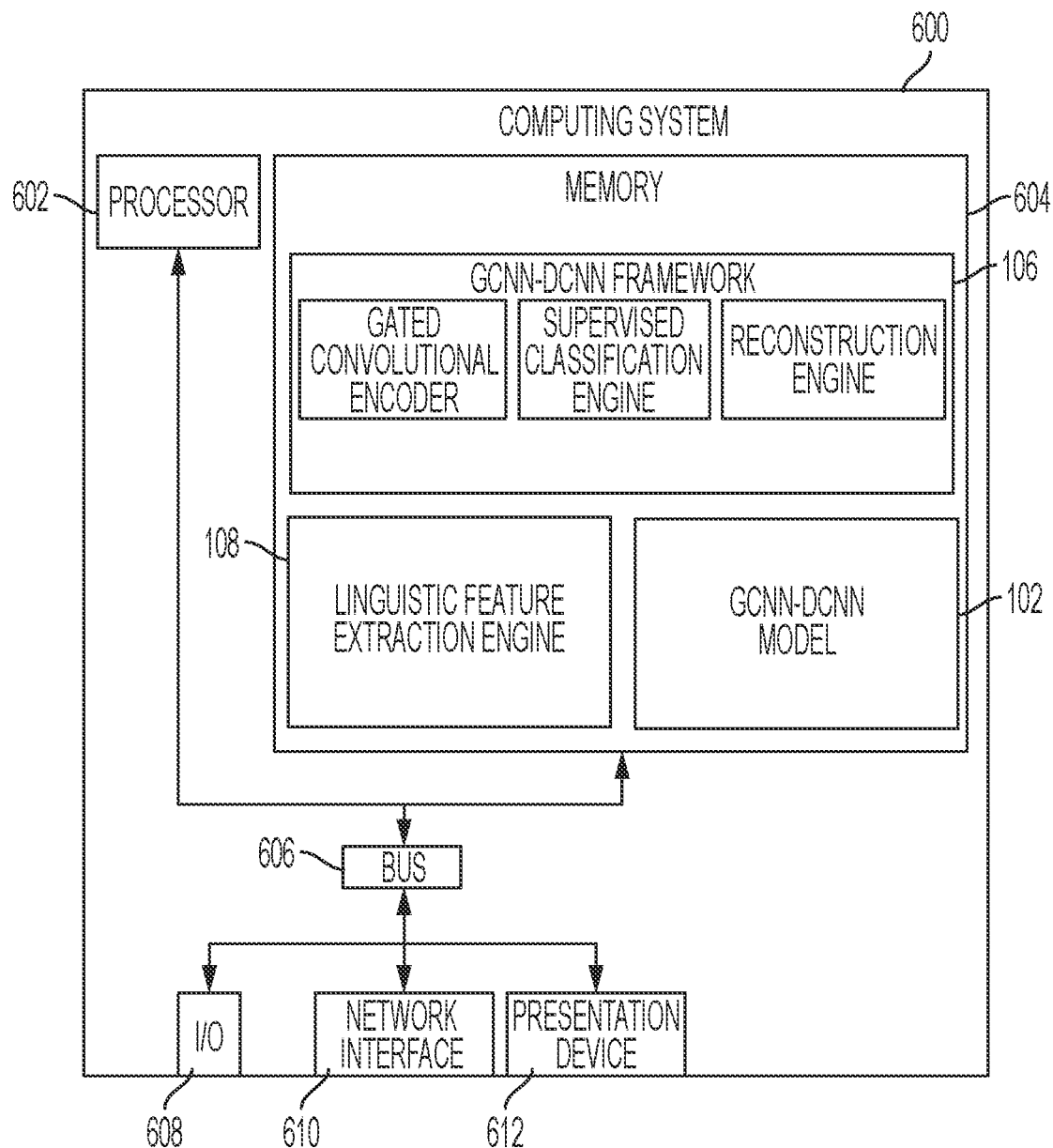
FIG. 6 depicts an example of a computing system for performing various operations described herein, according to certain embodiments of the present disclosure.

Any suitable computing system or group of computing systems can be used for performing the operations described herein. FIG. 6 depicts an example of a computing system 600 for performing various operations described herein, according to certain embodiments of the present disclosure. In some embodiments, the computing system 600 executes the GCNN-DCNN framework 106, as depicted in FIG. 6. In other embodiments, separate computing systems having devices similar to those depicted in FIG. 6 (e.g., a processor, a memory, etc.) separately execute the GCNN-DCNN framework 106.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices, such as input or output devices. For example, the computing system 600 is shown with one or more input/output ("I/O") interfaces 608. An I/O interface 608 can receive input from input devices or provide output to output devices. One or more buses 606 are also included in the computing system 600. The bus 606 communicatively couples one or more components of a respective one of the computing system 600.

The computing system 600 executes program code that configures the processor 602 to perform one or more of the operations described herein. The program code includes, for example, the GCNN-DCNN model 102, the GCNN-DCNN framework 106, the linguistic feature extraction engine 108, the gated convolutional encoder 110, the supervised classification engine 112, the reconstruction engine 114, or other suitable applications that perform one or more operations described herein. The program code may be resident in the memory device 604 or any suitable computer-readable medium and may be executed by the processor 602 or any other suitable processor. In additional or alternative embodiments, the program code described above is stored in one or more other memory devices accessible via a data network.

The computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and/or the like. The computing system 600 is able to communicate with one or more other computing devices via a data network using the network interface device 610.

In some embodiments, the computing system 600 also includes the presentation device 612. A presentation device 612 can include any device or group of devices suitable for providing visual, auditory, or other suitable sensory output. Non-limiting examples of the presentation device 612 include a touchscreen, a monitor, a speaker, a separate mobile computing device, etc. In some aspects, the presentation device 612 can include a remote client-computing device that communicates with the computing system 600 using one or more data networks described herein. Other aspects can omit the presentation device 612.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for identifying an affect label of text with a gated convolutional encoder-decoder model, wherein the method includes one or more processing devices performing operations comprising:
   receiving, at a supervised classification engine, extracted linguistic features of an input text and a latent representation of the input text;
   predicting, by the supervised classification engine, an affect characterization of the input text using the extracted linguistic features and the latent representation, wherein predicting the affect characterization comprises:
      normalizing and concatenating a linguistic feature representation generated from the extracted linguistic features with the latent representation to generate an appended latent representation; and
      identifying, by a gated convolutional encoder-decoder model, an affect label of the input text using the predicted affect characterization.

2. The method of claim 1, wherein the gated convolutional encoder-decoder model is jointly trained using a weighted auto-encoder loss associated with a reconstruction engine and a weighted classification loss associated with the supervised classification engine, and further comprising pre-training the reconstruction engine by:
   encoding, by the gated convolutional encoder, training data to generate an initial latent representation of the training data; and
   reducing an initial auto-encoder loss associated with decoding the initial latent representation of the training data, wherein the initial auto-encoder loss is based on a comparison between a decoded initial latent representation of the training data and the training data.

3. The method of claim 1, wherein the gated convolutional encoder-decoder model is jointly trained using a weighted auto-encoder loss associated with a reconstruction engine and a weighted classification loss associated with the supervised classification engine, further comprising jointly training the gated convolutional encoder-decoder model by:
   encoding, by the gated convolutional encoder, training data to generate an initial latent representation of the training data;
   training, by the reconstruction engine, the gated convolutional encoder-decoder model to reduce the weighted auto-encoder loss associated with decoding the initial latent representation of the training data; and
   training, by the supervised classification engine, the gated convolutional encoder-decoder model to reduce the weighted classification loss associated with predicting an affect classification of the training data, wherein jointly training the gated convolutional encoder-decoder model comprises balancing a first weight attributed to the weighted auto-encoder loss and a second weight attributed to the weighted classification loss.

4. The method of claim 1, wherein predicting the affect characterization of the input text using the extracted linguistic features and the latent representation further comprises:
   generating the linguistic feature representation by extracting the extracted linguistic features from the input text; and
   providing the appended latent representation to a set of fully connected layers with a Softmax classifier loss layer to generate the predicted affect characterization of the input text.

5. The method of claim 4, wherein the extracted linguistic features comprise lexical features, syntactic features, derived features, and psycholinguistic features of the input text.

6. The method of claim 1, wherein the gated convolutional encoder-decoder model comprises a supervised component, a gated architecture, a pre-training component, a joint training component, and a linguistic feature component.

7. The method of claim 1, wherein the gated convolutional encoder-decoder model is jointly trained using a weighted auto-encoder loss associated with a reconstruction engine and a weighted classification loss associated with the supervised classification engine, further comprising:
   generating, by the gated convolutional encoder, a training latent representation of training data, wherein jointly training the gated convolutional encoder-decoder model is performed using the training latent representation of the training data.

8. The method of claim 1, wherein the gated convolutional encoder-decoder model is jointly trained using a weighted auto-encoder loss associated with a reconstruction engine and a weighted classification loss associated with the supervised classification engine, wherein jointly training the gated convolutional encoder-decoder model using the weighted classification loss comprises:
   extracting training linguistic features from training data into a training linguistic feature vector representation;
   encoding the training data to generate a training latent representation of the training data;
   normalizing and concatenating the training linguistic feature vector representation with the training latent representation to generate a training appended latent representation;
   providing the training appended latent representation to a set of fully connected layers with a Softmax classifier loss layer to generate a predicted affect classification of the training data;
   comparing the predicted affect classification of the training data to a ground-truth label of the training data; and
   training the gated convolutional encoder-decoder model using the weighted classification loss based on a comparison between the predicted affect classification of the training data and the ground-truth label of the training data.

9. A computing system comprising:
   means for receiving, at a supervised classification engine, extracted linguistic features of an input text and a latent representation of the input text;
   means for predicting, by the supervised classification engine, an affect characterization of the input text using the extracted linguistic features and the latent representation, wherein predicting the affect characterization comprises:
      normalizing and concatenating a linguistic feature representation generated from the extracted linguistic features with the latent representation to generate an appended latent representation; and
   means for identifying, by a gated convolutional encoder-decoder model, an affect label of the input text using the predicted affect characterization.

10. The computing system of claim 9, wherein the gated convolutional encoder-decoder model is jointly trained using a weighted auto-encoder loss associated with a reconstruction engine and a weighted classification loss associated with the supervised classification engine, and further comprising:

means for pre-training the reconstruction engine by:
    encoding, by the gated convolutional encoder, training data to generate an initial latent representation of the training data; and
    reducing an initial auto-encoder loss associated with decoding the initial latent representation of the training data, wherein the initial auto-encoder loss is based on a comparison between a decoded initial latent representation of the training data and the training data.

11. The computing system of claim 9, wherein the gated convolutional encoder-decoder model is jointly trained using a weighted auto-encoder loss associated with a reconstruction engine and a weighted classification loss associated with the supervised classification engine, and further comprising:
    means for jointly training the gated convolutional encoder-decoder model by:
        encoding, by the gated convolutional encoder, training data to generate an initial latent representation of the training data;
        training, by the reconstruction engine, the gated convolutional encoder-decoder model to reduce the weighted auto-encoder loss associated with decoding the initial latent representation of the training data; and
        training, by the supervised classification engine, the gated convolutional encoder-decoder model to reduce the weighted classification loss associated with predicting an affect classification of the training data, wherein jointly training the gated convolutional encoder-decoder model comprises balancing a first weight attributed to the weighted auto-encoder loss and a second weight attributed to the weighted classification loss.

12. The computing system of claim 9, wherein the means for predicting the affect characterization of the input text using the extracted linguistic features and the latent representation further comprises:
    means for extracting the extracted linguistic features from the input text into the linguistic feature representation; and
    means for providing the appended latent representation to a set of fully connected layers with a Softmax classifier loss layer to generate the predicted affect characterization of the input text.

13. The computing system of claim 12, wherein the extracted linguistic features comprise lexical features, syntactic features, derived features, and psycholinguistic features of the input text.

14. The computing system of claim 9, wherein the gated convolutional encoder-decoder model comprises a supervised component, a gated architecture, a pre-training component, a joint training component, and a linguistic feature component.

15. The computing system of claim 9, wherein the gated convolutional encoder-decoder model is jointly trained using a weighted auto-encoder loss associated with a reconstruction engine and a weighted classification loss associated with the supervised classification engine, further comprising:
    means for generating, by the gated convolutional encoder, a training latent representation of training data, wherein jointly training the gated convolutional encoder-decoder model is performed using the training latent representation of the training data.

16. A non-transitory computer-readable medium having instructions stored thereon, the instructions executable by a processing device to perform operations comprising:
    receiving, at a supervised classification engine, extracted linguistic features of an input text and a latent representation of the input text;
    predicting, by the supervised classification engine, an affect characterization of the input text using the extracted linguistic features and the latent representation, wherein predicting the affect characterization comprises:
        normalizing and concatenating a linguistic feature representation generated from the extracted linguistic features with the latent representation to generate an appended latent representation; and
        identifying, by a gated convolutional encoder-decoder model, an affect label of the input text using the predicted affect characterization, wherein the gated convolutional encoder-decoder model is jointly trained using a weighted auto-encoder loss associated with a reconstruction engine and a weighted classification loss associated with the supervised classification engine.

17. The non-transitory computer-readable medium of claim 16, wherein the gated convolutional encoder-decoder model is jointly trained using a weighted auto-encoder loss associated with a reconstruction engine and a weighted classification loss associated with the supervised classification engine, wherein jointly training the gated convolutional encoder-decoder model using the weighted classification loss comprises:
    extracting training linguistic features from training data into a training linguistic feature vector representation;
    encoding the training data to generate a training latent representation of the training data;
    normalizing and concatenating the training linguistic feature vector representation with the training latent representation to generate a training appended latent representation;
    providing the training appended latent representation to a set of fully connected layers with a Softmax classifier loss layer to generate a predicted affect classification of the training data;
    comparing the predicted affect classification of the training data to a ground-truth label of the training data; and
    training the gated convolutional encoder-decoder model using the weighted classification loss based on a comparison between the predicted affect classification of the training data and the ground-truth label of the training data.

18. The non-transitory computer-readable medium of claim 16, wherein the gated convolutional encoder-decoder model is jointly trained using a weighted auto-encoder loss associated with a reconstruction engine and a weighted classification loss associated with the supervised classification engine, the instructions further executable by the processing device to perform operations comprising:
    pre-training the reconstruction engine by:
        encoding, by the gated convolutional encoder, training data to generate an initial latent representation of the training data; and
        reducing an initial auto-encoder loss associated with decoding the initial latent representation of the training data, wherein the initial auto-encoder loss is based on a comparison between a decoded initial latent representation of the training data and the training data.

19. The non-transitory computer-readable medium of claim 16, wherein the gated convolutional encoder-decoder model is jointly trained using a weighted auto-encoder loss associated with a reconstruction engine and a weighted classification loss associated with the supervised classification engine, the instructions further executable by the processing device to perform operations comprising:
   jointly training the gated convolutional encoder-decoder model by:
      encoding, by the gated convolutional encoder, training data to generate an initial latent representation of the training data;
      training, by the reconstruction engine, the gated convolutional encoder-decoder model to reduce the weighted auto-encoder loss associated with decoding the initial latent representation of the training data; and
      training, by the supervised classification engine, the gated convolutional encoder-decoder model to reduce the weighted classification loss associated with predicting an affect classification of the training data, wherein jointly training the gated convolutional encoder-decoder model comprises balancing a first weight attributed to the weighted auto-encoder loss and a second weight attributed to the weighted classification loss.

20. The non-transitory computer-readable medium of claim 16, wherein instructions executable by the processing device to perform operations comprising predicting the affect characterization of the input text using the extracted linguistic features and the latent representation comprise:
   extracting the extracted linguistic features from the input text into the linguistic feature representation; and
   providing the appended latent representation to a set of fully connected layers with a Softmax classifier loss layer to generate the predicted affect characterization of the input text.

* * * * *